(12) United States Patent
Choi

(10) Patent No.: US 11,663,649 B2
(45) Date of Patent: May 30, 2023

(54) DIGITAL PRICE DISPLAY SYSTEM BASED ON NFC AND BLUETOOTH

(71) Applicant: APELLES CO., LTD., Seongnam-si (KR)

(72) Inventor: Min Woong Choi, Seoul (KR)

(73) Assignee: APELLES CO., LTD., Seongnam-si (KR)

( * ) Notice: Subject to any disclaimer, the term of this patent is extended or adjusted under 35 U.S.C. 154(b) by 0 days.

(21) Appl. No.: 17/902,321

(22) Filed: Sep. 2, 2022

(65) Prior Publication Data

US 2023/0069893 A1 Mar. 9, 2023

(30) Foreign Application Priority Data

Sep. 6, 2021 (KR) .......................... 10-2021-0118411

(51) Int. Cl.
- *G06Q 30/00* (2023.01)
- *G06Q 30/0601* (2023.01)
- *G06K 19/07* (2006.01)
- *G09F 9/30* (2006.01)

(52) U.S. Cl.
CPC ..... *G06Q 30/0641* (2013.01); *G06K 19/0723* (2013.01); *G06Q 30/0627* (2013.01); *G09F 9/30* (2013.01)

(58) Field of Classification Search
CPC ........... G06Q 30/0641; G06Q 30/0627; G06K 19/073; G06K 19/0723; G09F 9/30
USPC ........................................................ 705/27.1
See application file for complete search history.

(56) References Cited

U.S. PATENT DOCUMENTS

| | | | |
|---|---|---|---|
| 2010/0106588 A1* | 4/2010 | Jones ................ | G06Q 30/0223 709/248 |
| 2016/0359525 A1* | 12/2016 | Griffin .................... | H04W 4/80 |
| 2017/0262141 A1* | 9/2017 | Soga ..................... | G06F 40/123 |
| 2020/0402429 A1* | 12/2020 | Cho ....................... | G06Q 10/087 |

FOREIGN PATENT DOCUMENTS

| | | |
|---|---|---|
| KR | 10-2013-0015264 A | 2/2013 |
| KR | 10-2016-0003998 A | 1/2016 |
| KR | 10-1589666 B1 | 2/2016 |
| KR | 10-2016-0070505 A | 6/2016 |
| KR | 10-1692505 B1 | 1/2017 |
| KR | 10-2021-0108219 A | 9/2021 |
| KR | 10-2206175 B1 | 1/2022 |

OTHER PUBLICATIONS

Kahl, G., A plugin framework to control electronic shelf labels, Sep. 2013, Proceedings of the 2013 ACM conference on Pervasive and ubiquitous computing adjunct publication, pp. 1007-1014. (Year: 2013).*

Korea Intellectual Property Office, KR Office Action issued in KR Application No. 10-2021-0118411, dated Oct. 8, 2021, pp. 1-8.

* cited by examiner

*Primary Examiner* — Jeffrey A. Smith
*Assistant Examiner* — Brittany E Bargeon
(74) *Attorney, Agent, or Firm* — Dinsmore & Shohl LLP

(57) ABSTRACT

The present invention relates to a near field communication (NFC) and a Bluetooth-based digital price display system, and providing a digital price indicator communicating with a server to change information in real time, display information on a product, and replace a tag with an application installed in the digital price indicator.

5 Claims, 15 Drawing Sheets

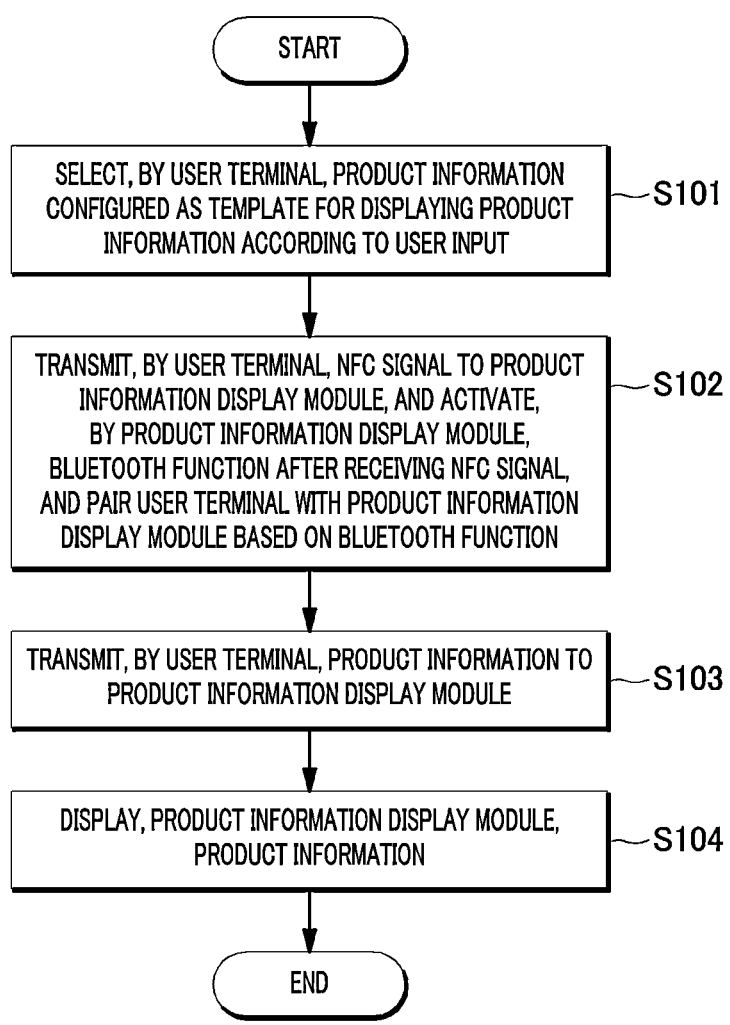

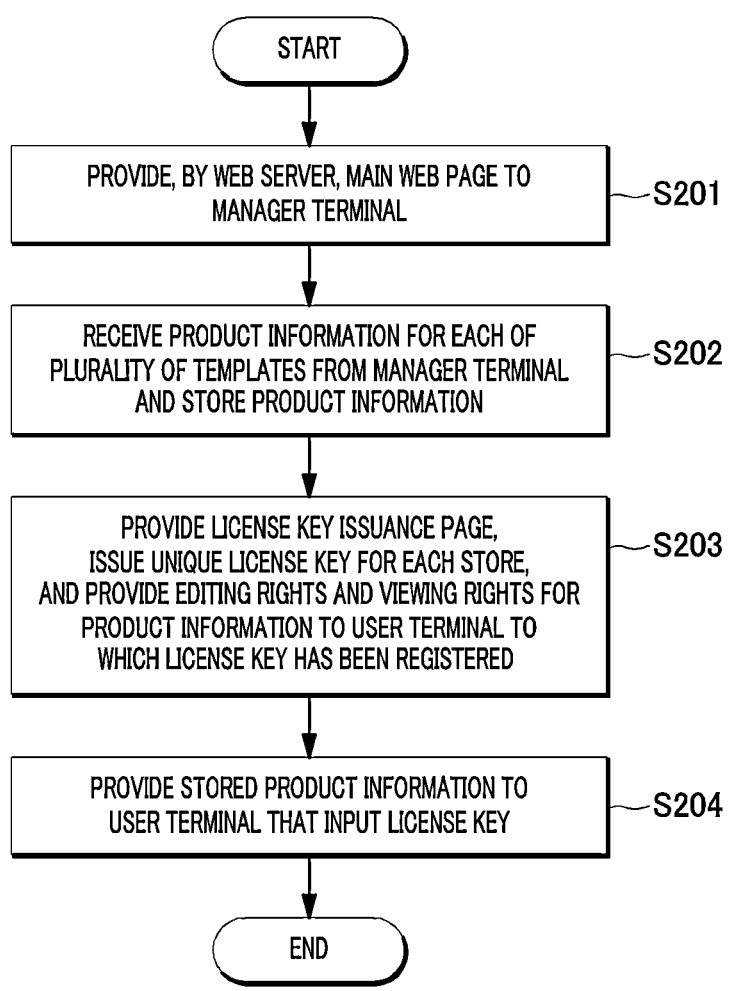

DIGITAL PRICE DISPLAY SYSTEM BASED ON NFC AND BLUETOOTH

CROSS-REFERENCE TO RELATED APPLICATIONS

The present application claims priority under 35 U.S.C 119(a) to Korean Patent Application No. 10-2021-0118411, filed on Sep. 6, 2021, which is incorporated herein by reference in its entirety.

BACKGROUND

1. Technical Field

The present disclosure relates to a digital price display system based on near field communication (NFC) and Bluetooth, and more particularly, to a digital price display solution that provides information update through a mobile application and easily performs installation and operation.

2. Related Art

Recently, a global market size for electronic price display devices that digitally display prices has steeply increased from 270 billion won in 2015 to 1.3 trillion won in 2021.

In particular, the market size has increased from 900 billion won in 2020 to 1.3 trillion won in 2021, exceeding 1 trillion won, and in 2022, the market size is expected to exceed 1.8 trillion won, close to 2 trillion won.

It is known that, in Europe, famous retailers, such as TESCO and Metro, started to use electronic price display devices since 2010, and in France and northern Europe, a use rate exceeds 30%.

Similarly, in North America, famous retailers, such as Macys and Lowe's, have used the electronic price display devices since 2017.

In the domestic market, famous franchise large marts, such as E-Mart, Lotte Mart, and Hi-Mart, started to use the electronic price display devices in 2019, and early stage of market formation is passing.

Accordingly, there is a need for a method of providing an electronic price display device system that may be easily operated and installed through an application provided by a user terminal.

SUMMARY

Paper tags printed on paper for each item that sells the set price and detailed information on items have been used for the known price tags used in stores such as retail stores and large marts.

This method accompanies a process of directly re-printing to replace or directly modifying paper tags for each item whenever product information changes, and thus, additional costs and labor costs are required.

In order to solve the problems described above, the present disclosure proposes a more accurate tag system that may change information in real time by providing a digital price display system based on NFC and Bluetooth.

An object of the present disclosure is to reduce the required replacement costs and labor costs by easily replacing and managing existing paper tags through an application installed in a terminal.

Furthermore, the present disclosure aims at a digital price display provision solution that may be transplanted to a field without additional network construction or additional installation of a server and an access point (AP) in the existing mart.

Objects to be achieved by the present disclosure are not limited to the objects described above, and other objects not described will be clearly understood from the descriptions below.

According to an embodiment of the present disclosure, a method of providing a digital price display system based on near field communication (NFC) and Bluetooth, which is performed by a user terminal, includes (a) selecting, by the user terminal, product information composed of a preset template to display the product information according to a user input, (b) transmitting an NFC signal to a product information display module by the user terminal and pairing the user terminal with the product information display module based on a Bluetooth function as the product information display module activates the Bluetooth function after receiving the NFC signal, (c) transmitting, by the user terminal, the product information to the product information display module, and (d) displaying the product information by the product information display module, the template includes at least one of a product name, an English product name, a country of origin, a product price, a raw material, and weight/calorie depending on product types, and a font, a size, and a color are configured differently for each template.

In addition, in (b), an NFC communication module is built in a region of a front surface that displays a screen of the product information display module, and as a rear surface of the user terminal approaches the front surface of the product information display module, the user terminal communication with the NFC communication module to automatically activate a Bluetooth function, and when Bluetooth is activated, a light source of the corresponding product information display module emits green light, and the pairing is a master-slave connection in which the product information display module is a master and the user terminal is a slave, the user terminal can be automatically paired with the closest product information display module.

In addition, the user terminal may have a built-in NFC communication module, and before (a), a template management application may be installed to receive the template from a web server and store at least one template.

In addition, in (b), as a template management application is executed by the user terminal, a main UI including a tag registration button, a tag management button, and a template management button may be provided to the user terminal, and when the tag registration button is clicked, a tag registration guide UI may be provided.

In addition, the tag registration guide UI may include a template selection button, a tag activation button, and a data transmission button, and when the template selection button is clicked, a template selection UI may be provided which provides a plurality of templates received from the web server in thumbnail format for each standard of the product information display module.

In addition, when the thumbnail is clicked by a user input, an editing UI may be provided, and the editing UI may include a setting region for randomly setting a font, a size, and a color for the template, a preview button providing an example in which the setting for the template is displayed on the product information display module in one region of a lower portion of the setting region, and a selection completion button.

In addition, when the selection completion button is clicked, a completion GUI indicating that template selection may be completed is provided on the template selection button in the tag registration guide UI, and when the activating of the Bluetooth function is performed, the completion GUI may be provided on the tag activation button, and when the transmitting of the product information is performed, the completion GUI may be displayed on the data transmission button, and a transmission completion page indicating that data transmission is completed may be provided by the application of the user terminal, and a light source of the product information display module may emit green light to indicate that the data transmission is completed.

In addition, when the tag management button is clicked, a product information display module list including identification information on at least one product information display module set to receive and transmit a template from the user terminal may be provided by the user input, when the user terminal is paired with the product information display module in a state in which the tag management button is clicked, an editing UI for the template displayed by the product information display module may be provided, and when the identification information in the product information display module list is clicked, the template currently transmitted by the product information display module may be provided to the user terminal, and an editing UI for the template is provided.

In addition, when the template management button is clicked, the template selection UI may be provided, and when a specific thumbnail is selected, an editing UI for a relevant template may be provided.

According to an another embodiment, a terminal for performing a method of providing a digital price display system based on NFC and Bluetooth, includes a memory storing a program for performing the method of providing the digital price display system based on NFC and Bluetooth, and a processor for executing the program, wherein the method includes (a) selecting, by the user terminal, product information composed of a preset template to display the product information according to a user input, (b) transmitting an NFC signal to a product information display module by the user terminal and pairing the user terminal with the product information display module based on a Bluetooth function as the product information display module activates the Bluetooth function after receiving the NFC signal, (c) transmitting, by the user terminal, the product information to the product information display module, and (d) displaying the product information by the product information display module, the template includes at least one of a product name, an English product name, a country of origin, a product price, a raw material, and weight/calorie depending on product types, and a font, a size, and a color are configured differently for each template.

BRIEF DESCRIPTION OF THE DRAWINGS

Various embodiments of the present disclosure will become more apparent in view of the attached drawings and accompanying detailed description, in which:

FIG. 6 is a flowchart of a method of providing a digital price display system based on NFC and Bluetooth, according to an embodiment of the present disclosure; and FIG. 7 is a flowchart of a method of providing a web page for managing a digital price display system based on NFC and Bluetooth, according to an embodiment of the present disclosure.

DETAILED DESCRIPTION OF THE EMBODIMENTS

Figure 1:
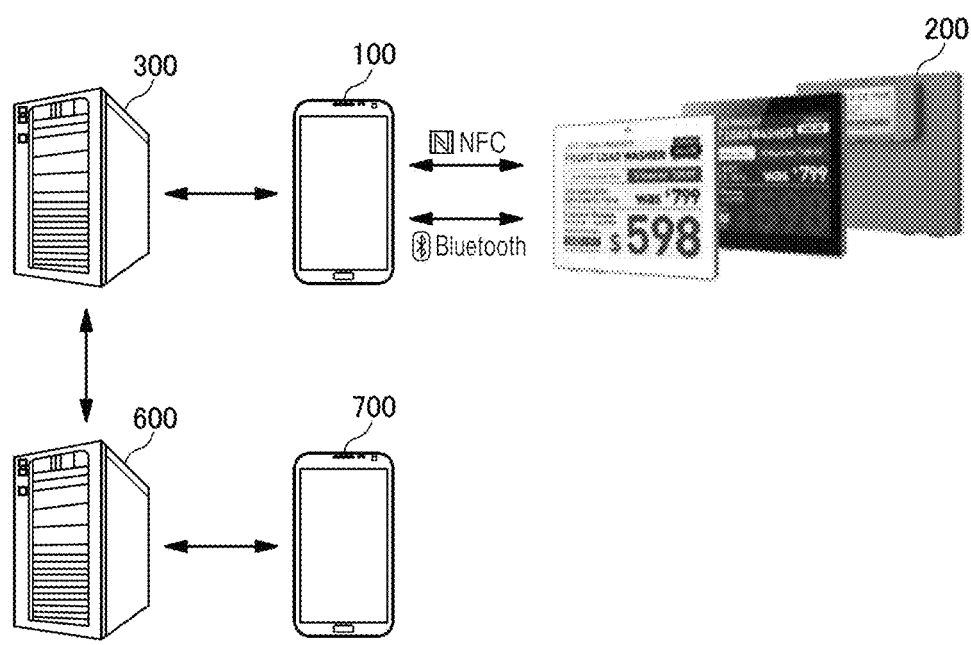
FIG. 1 is a structural diagram of a digital price display system based on near field communication (NFC) and Bluetooth, according to an embodiment of the present disclosure.

Hereinafter, embodiments of the present disclosure will be described in detail with reference to the accompanying drawings such that those skilled in the art may easily implement the embodiments. However, the present disclosure may be embodied in several different forms and is not limited to the embodiments described herein. In order to clearly describe the present disclosure in the drawings, parts irrelevant to the description are omitted, and similar reference numerals are attached to similar components throughout the specification.

Throughout the specification, when a portion is "connected" or "coupled" to another portion, this includes not only a case of being "directly connected or coupled" but also a case of being "electrically connected" with another element interposed therebetween. In addition, when a portion "includes" a certain component, this means that other components may be further included therein rather than excluding other components, unless otherwise stated.

In the present specification, a "part" includes a unit realized by hardware, a unit realized by software, and a unit realized using both. In addition, one unit may be implemented by using two or more hardware, and two or more units may be implemented by one hardware. Meanwhile, '~ section' is not limited to software or hardware, and '~ section' may be configured to be in an addressable storage medium or may be configured to regenerate one or more processors. Accordingly, as an example, '~ section' indicates configuration elements such as software configuration elements, object-oriented software configuration elements, class configuration elements, and task configuration elements, and progresses, functions, properties, and procedures, subroutines, segments of program code, drivers, firmware, microcode, circuitry, data, databases, data structures, tables, arrays, and variables. The functions provided in the configuration elements and '~ sections' may be combined into a smaller number of configuration elements and '~ sections' or further separated into additional configuration elements and '~ sections'. In addition, configuration elements and '~ sections' may be implemented to regenerate one or more CPUs in a device or secure multimedia card.

A "user terminal" referred to below may be implemented as a computer or portable terminal that may access a server or another terminal through a network. Here, the computer may include, for example, a laptop computer, a desktop computer, or a laptop computer including a web browser, a virtual reality head mounted display (VR HMD) (for example, HTC VIVE, Oculus Rift, GearVR, DayDream, PSVR, or so on), or so on. Here, the VR HMD may include an HMD for a personal computer (PC) (for example, HTC VIVE, Oculus Rift, FOVE, Deepon, or so on), an HMD for mobile (for example, GearVR, DayDream, Storm Horse, Google Cardboard, or so on), and a stand-alone model (for example, Deepon, PICO, or so on) that is independently implemented. The portable terminal is, for example, a wireless communication device that guarantees portability and mobility and includes not only a smartphone, a tablet PC, and a wearable device, but also various devices equipped with a communication module of, for example, Bluetooth (Bluetooth low energy (BLE)), near field communication (NFC), radio frequency identification (RFID), ultrasonic, infrared, Wi-Fi, Li-Fi, or so on. In addition, the "network" indicates a connection structure in which information may be exchanged between respective nodes such as terminals and servers and includes a local area network (LAN), a wide area network (WAN), the Internet (world wide web (WEB)), a wired and wireless data network, a telephone network, a wired and wireless television network, and so on. The wireless data communication network includes, for example, 3 generation (3G), 4G, 5G, 3rd generation partnership project (3GPP), long term evolution (LTE), world interoperability for microwave access (WIMAX), Wi-Fi, Bluetooth communication, infrared communication, ultrasonic Communication, visible light communication (VLC), LiFi, and so on but are not limited thereto.

A digital price display system based on near field communication (NFC) and Bluetooth, according to an embodiment of the present disclosure will be described with reference to FIG. 1.

The digital price display system based on NFC and Bluetooth, according to an embodiment of the present disclosure may include a user terminal 100, a product information display module 200, a web server 300, a manager server 600, and a manager terminal 700.

The user terminal 100 may include a built-in NFC communication module and a program and an application for performing a method of providing the digital price display system based on NFC and Bluetooth, which are installed therein and may store at least one template by receiving a plurality of templates from the web server 300.

In this case, the user terminal 100 may include all devices capable of Bluetooth communication and programs therefor and NFC communication devices and programs therefor, which are installed therein, and in particular, an NFC communication module may be built in on an opposite side of a smartphone liquid crystal, as in the case of a general smartphone device.

The product information display module 200 may include a display panel 210 that displays a template including product information on a front surface, and an NFC communication module may be built in one region of the front surface for displaying the screen.

In addition, the product information display module 200 may include all components capable of Bluetooth communication and programs therefor.

Figure 2:
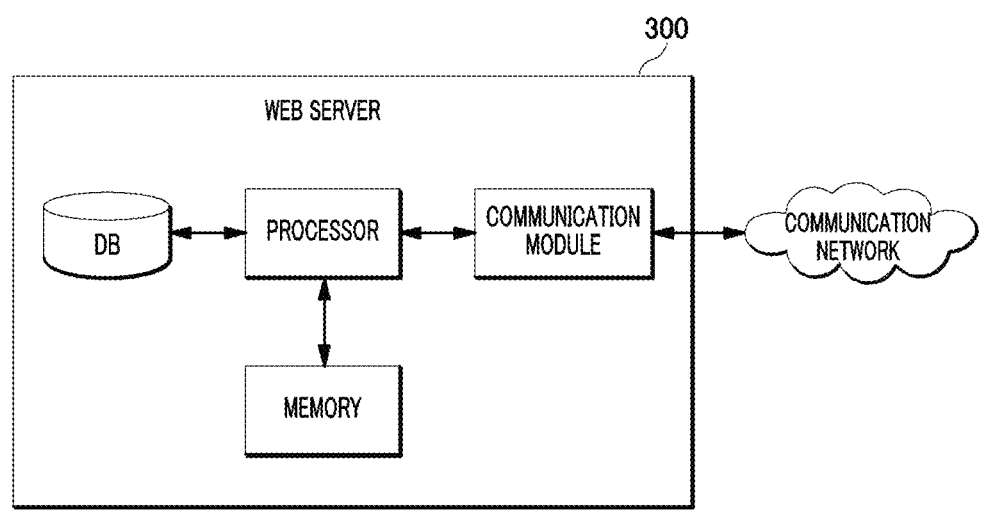
FIG. 2 is a block diagram illustrating an internal configuration of a web server according to an embodiment of the present disclosure.

Referring to FIG. 2, the web server 300 according to an embodiment of the present disclosure may include a memory storing a program and an application for performing a method of providing the digital price display system based on NFC and Bluetooth and include a processor for executing the program. Here, the processor may perform various functions according to execution of the program stored in the memory.

According to an embodiment of the present disclosure, the manager server 600 may be a server of a franchise company different from the web server 300 and may perform a function of providing a license key to the manager terminal 700 or the user terminal 100, and the web server 300 may also perform a role of the manager server 600.

Accordingly, the manager server 600 of the digital price display system based on NFC and Bluetooth, according to an embodiment of the present disclosure may be utilized by a franchise company or a person in charge of the company, which performs the above-described method.

The manager terminal 700 may be a terminal provided to a person serving as a middle manager of a store in which the digital price display system based on NFC and Bluetooth, according to an embodiment of the present disclosure is installed, or a license key may be issued to a terminal owned by a person, and the terminal may be given a role of a middle manager.

Accordingly, an operation performed by the manager terminal 700 according to an embodiment of the present disclosure may also be performed by the user terminal 100.

The present disclosure is a technology for providing an electronic price display system that operates based on NFC and Bluetooth and may change information in real time through web pages and an application.

Hereinafter, a method of providing the digital price display system based on NFC and Bluetooth, according to an embodiment of the present disclosure will be described.

First, in the method of providing the digital price display system based on NFC and Bluetooth, according to an embodiment of the present disclosure, the user terminal 100 selects product information composed of a preset template for displaying product information according to a user input.

In this case, the preset template may be provided through an application installed in the user terminal 100, and a user may select or edit the template by operating the user terminal 100.

A process in which the above-described template is provided as an application of the user terminal 100 will be described below.

After a template to be displayed on the product information display module 200 is selected and edited by a user, the user terminal 100 transmits an NFC signal to the product information display module 200, and the product information display module 200 received the NFC signal activates a Bluetooth function.

In this case, the Bluetooth function of the user terminal 100 may be activated previously before transmitting the NFC signal, but according to another embodiment of the present disclosure, the Bluetooth function may be activated simultaneously with or immediately after the NFC signal is transmitted.

The product information display module 200 having the Bluetooth function activated is paired with the user terminal 100 based on the Bluetooth function, and in this case, when the Bluetooth function between the user terminal 100 and the product information display module 200 is activated, a light source of the product information display module 200 emits green light.

According to an embodiment of the present disclosure, pairing is a master-slave connection in which the product information display module 200 is a master and the user terminal 100 is a slave, and the product information display module 200 may be automatically paired with the closest user terminal 100.

Through this, the product information display module 200 performs a role of a master only in a connection setting process with the user terminal 100, and thus, after Bluetooth connection, the product information display module 200 may be controlled on a screen to be displayed by the user terminal 100, and it is possible to reduce power consumption of the product information display module 200 compared to a case where the product information display module 200 is a slave.

Bluetooth pairing between two devices may indicate that an NFC communication module in one region of a front surface of the product information display module 200 in which a screen is displayed communicates with an NFC communication module of the user terminal 100 to automatically activate a Bluetooth function as a rear surface of the user terminal 100 approaches a front surface of the product information display module 200.

Accordingly, in a state in which the product information display module 200 is previously installed on a product display stand in a store, a manager or a user may perform pairing by easily approaching the user terminal 100 or the manager terminal 700.

That is, the two devices may be connected by causing the rear surface of the terminal to approach the front surface of the module, without the need to take the product information display module 200 out of the display stand to be paired.

Hereinafter, a process in which the above-described template is provided as an application of the user terminal 100 will be described.

Figure 2A:
FIG. 2A is an example view of a main user interface (UI) provided through an application, according to an embodiment of the present disclosure.
Figure 2A:
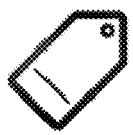
Figure 2A:
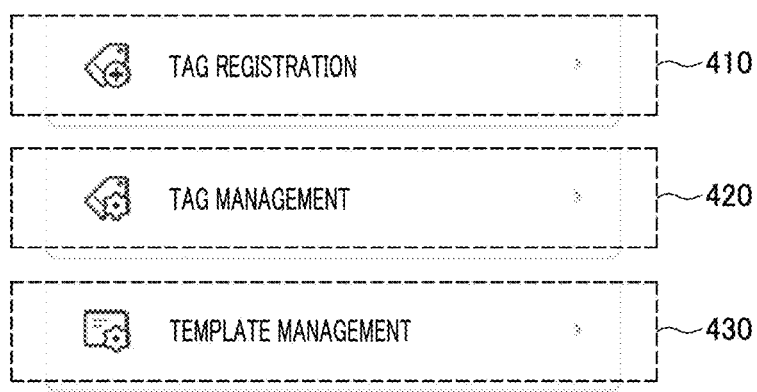
Figure 2A:

Referring to FIG. 2A, as a template management application is executed by the user terminal 100, a main user interface (UI) 400 including a tag registration button 410, a tag management button 420, and a template management button 430 is provided to the user terminal 100, and when the tag registration button 410 is clicked, a tag registration guide UI 411 may be provided.

Figure 2B:
FIG. 2B is an example view of a product information display module list UI provided through an application, according to an embodiment of the present disclosure.

Referring to FIG. 2B, when the tag management button 420 is clicked, a product information display module list 421 may be provided.

The product information display module list 421 includes identification information on at least one product information display module 200 set to receive and transmit a template from the user terminal 100 by a user input.

The product information display module list 421 may include identification information including identification numbers and names given to each of a plurality of product information display modules 200, summary text of the currently displayed template, and size information of a corresponding module.

In this case, when the identification information in the product information display module list 421 is clicked, a template currently transmitted by the product information display module 200 may be provided to the user terminal 100, and an editing UI 413 for the corresponding template may be provided.

Even when the user terminal 100 is paired with the product information display module 200 in a state where the tag management button 420 is clicked, the editing UI 413 for the template currently displayed by the product information display module 200 may be provided, and when the rear surface of the user terminal 100 approaches the front surface of the product information display module 200 in a state in which the tag management button 420 is not clicked, Bluetooth pairing is automatically performed to provide the editing UI 413 for the template being displayed by the adjacent product information display module 200.

Figure 2C:
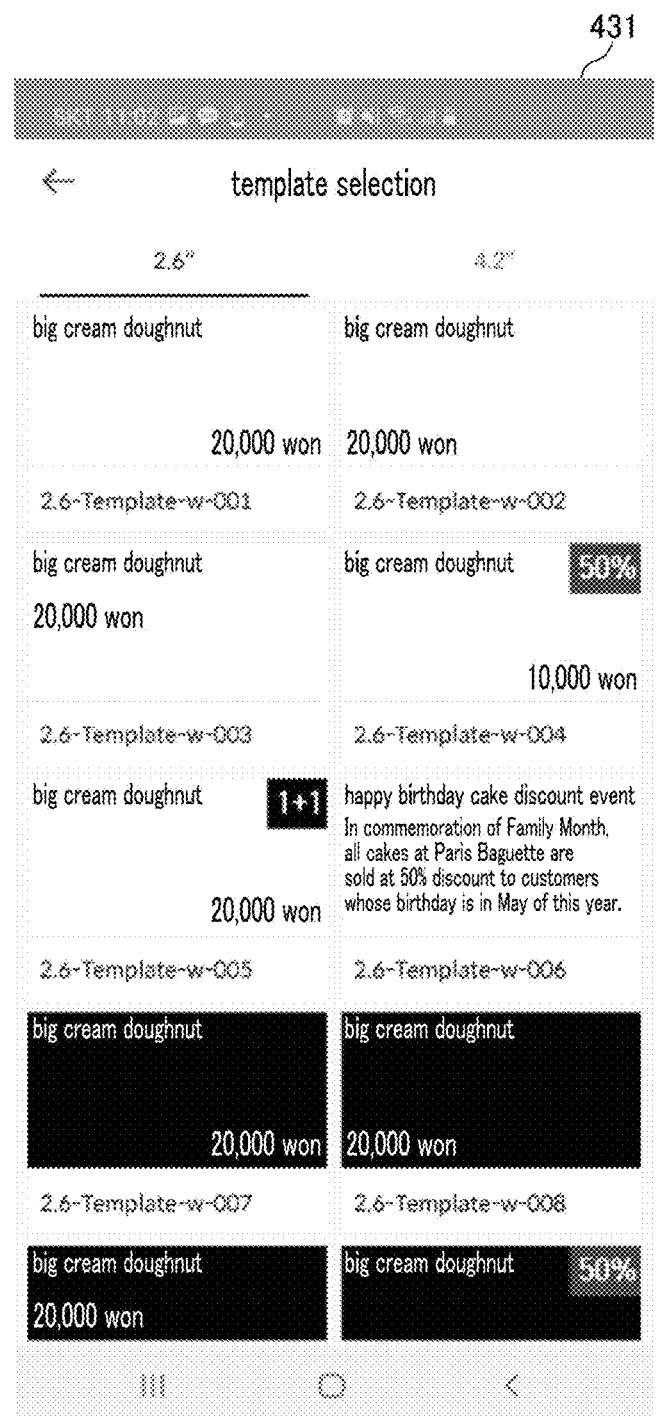
FIG. 2C is an example view of a template management UI provided through an application, according to an embodiment of the present disclosure.

Referring to FIG. 2C, when the template management button 430 is clicked, a template management UI 431 may be provided, but when a specific thumbnail is selected in the template management UI 431, the editing UI 413 for the template may be provided.

According to an embodiment of the present disclosure, a user may be guided, through a tag registration UI, a series of processes for displaying product information on the product information display module 200 installed on a display stand in a store.

Figure 3A:
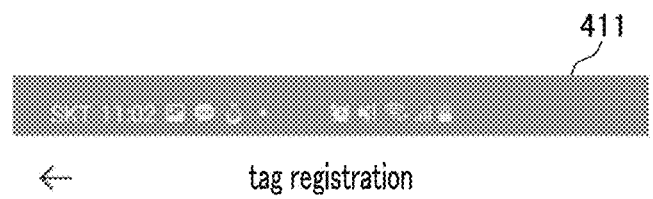
FIG. 3A is an example view of a tag registration guide UI provided through an application, according to an embodiment of the present disclosure.
Figure 3A:
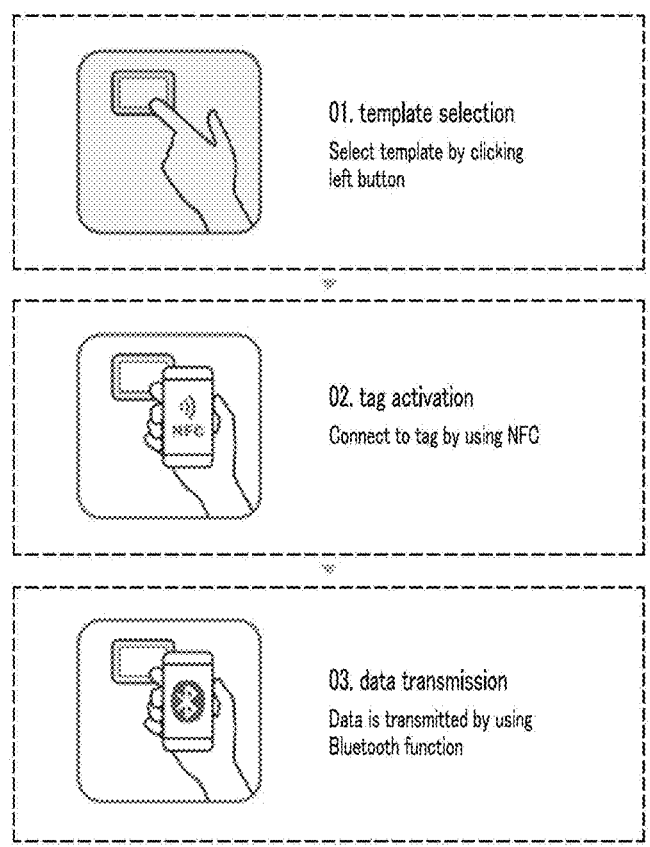
Figure 3A:

Referring to FIG. 3A, the tag registration guide UI 411 includes a template selection button, a tag activation button, and a data transmission button, and the respective buttons include a guide text and a guide icon for a sequence of performing a method of providing a digital price display system based on NFC and Bluetooth.

Figure 3B:
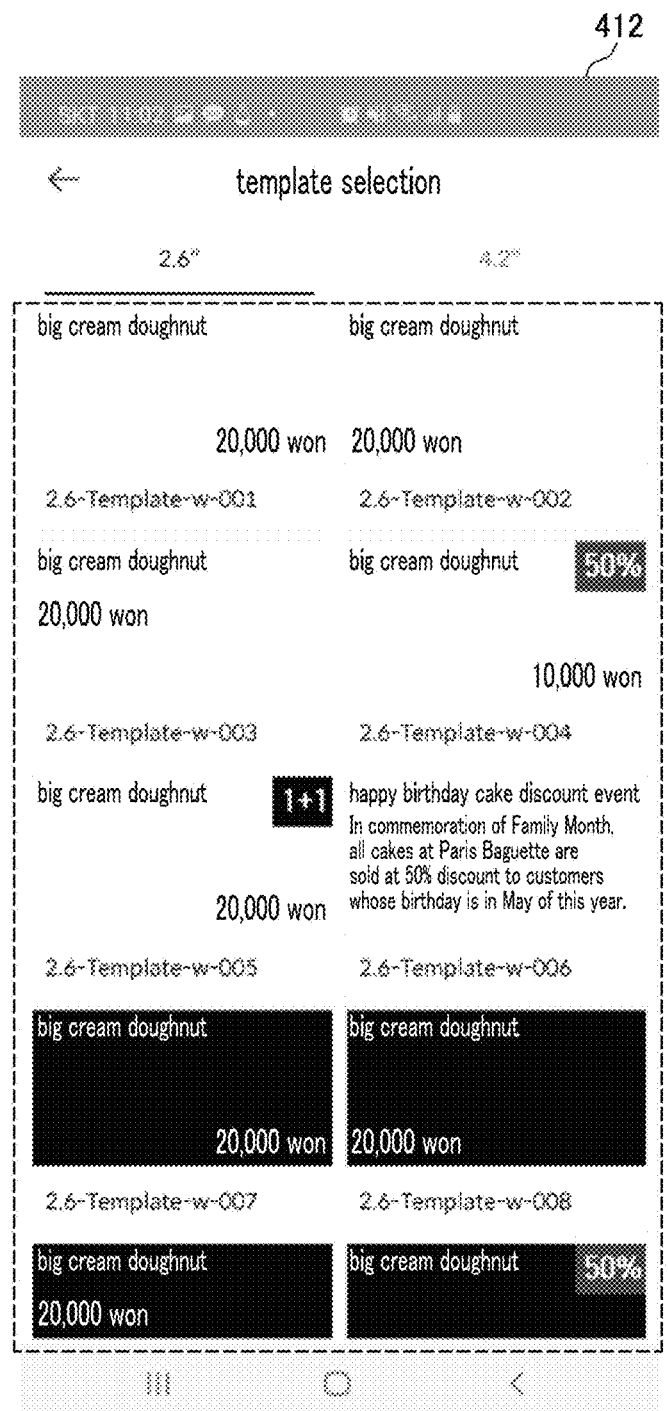
FIG. 3B is an example view of a template selection UI provided through an application, according to an embodiment of the present disclosure.

Referring to FIG. 3B, when a user clicks the template selection button among the buttons, a template selection UI 412, which provides a plurality of templates received from the web server 300 for each standard of the product information display module 200 in the form of thumbnails, may be provided.

A plurality of template thumbnails provided to the template selection UI 412 may be provided in a reduced form to be displayed in the product information display module 200, and the respective thumbnails may be provided by being classified for each size of the product information display module 200.

Figure 3C:
FIG. 3C is an example view of an editing UI provided through an application, according to an embodiment of the present disclosure.

Referring to FIG. 3C, when one of the plurality of thumbnails is selected and clicked, the editing UI 413 may be provided.

The editing UI 413 includes a setting region in which a font, a size, and a color for the selected template is randomly set and includes a preview button and a selection completion button that provide an example in which setting for the template is displayed on the product information display module 200, in one region below the setting region.

After selection and editing for the template are completed by the editing UI 413, a user clicks the selection completion button to cause the user terminal 100 to transmit product information to the product information display module 200.

Figure 4A:
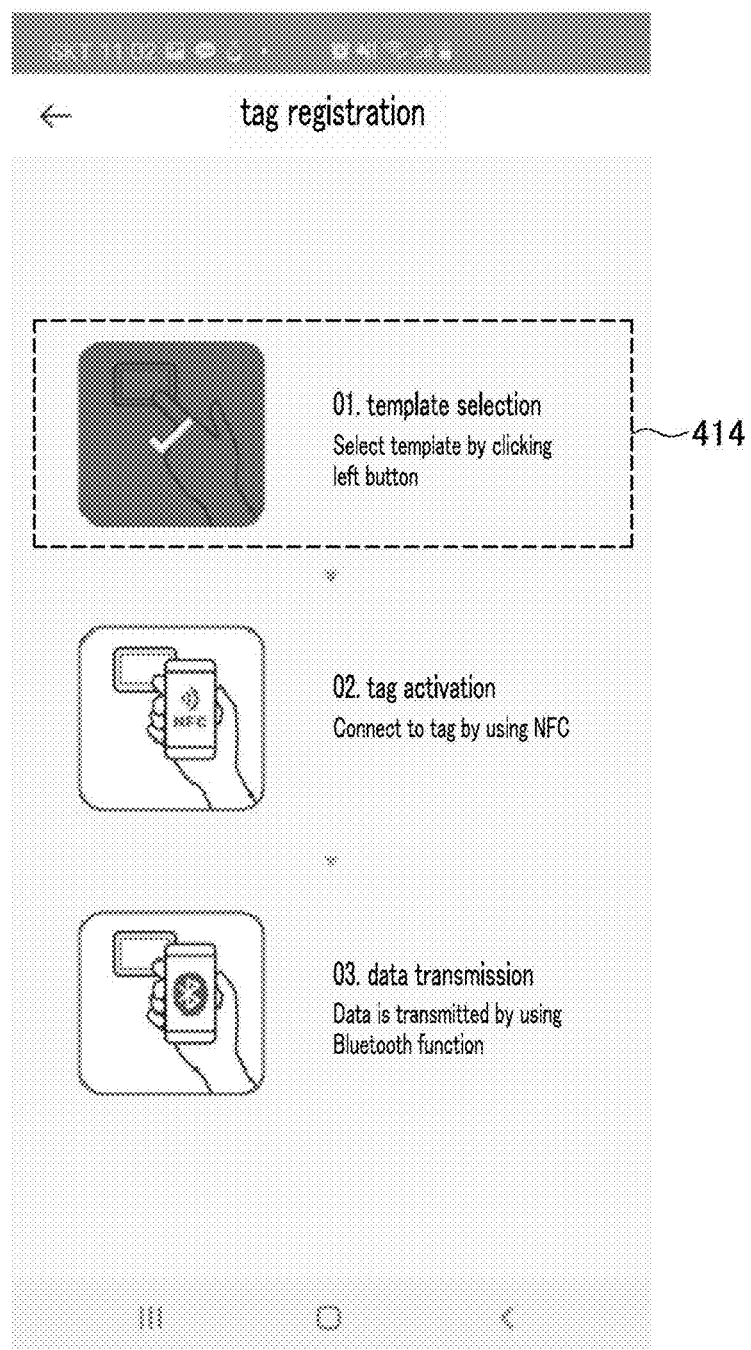
FIG. 4A is an example view of a completion graphical user interface (GUI) displayed on a tag registration guide UI, according to an embodiment of the present disclosure.

Referring to FIG. 4A, when the selection completion button is clicked, a completion graphical user interface (GUI) 414 indicating that template selection is completed may be provided on the template selection button in the tag registration guide UI 411.

Likewise, when each step guided by the tag registration guide UI 411 is performed, the completion GUI 414 is provided on a button for guiding a corresponding step.

The completion GUI 414 may reduce brightness of a preset template selection button, a tag activation button, and a data transmission button and display a V-shaped identifier.

Figure 4B:
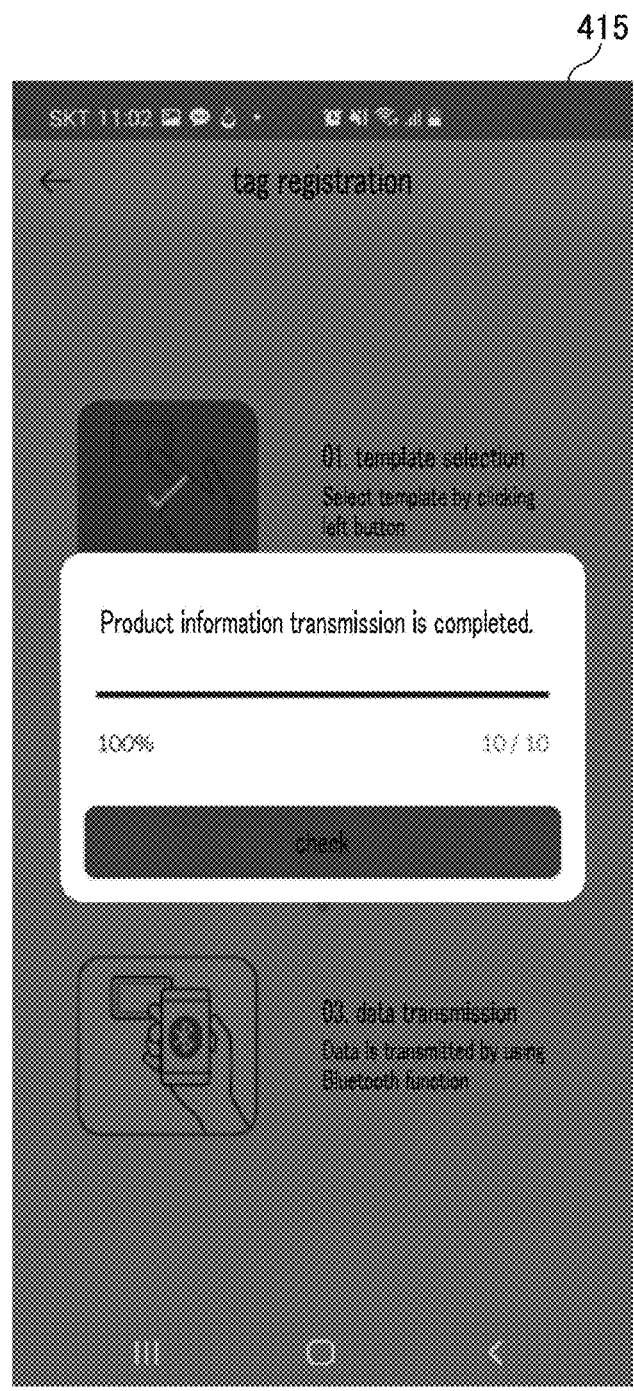
FIG. 4B is an example view of a transmission completion page provided through an application, according to an embodiment of the present disclosure.

Accordingly, referring to FIG. 4B, when product information is transmitted from the user terminal 100 to the product information display module 200, a completion GUI 414 is displayed on the data transmission button, and a transmission completion page 415 indicating that the data transmission is completed may be provided through an application on the user terminal 100.

In this case, a light source of an LED communication completion lamp 220 provided in the product information display module 200 may emit green light to indicate that data transmission is completed.

Thereafter, the product information display module 200 may display product information received from the user terminal 100, that is, a template.

A template according to an embodiment of the present disclosure may include at least one of a product name, English product name, country of origin, product price, raw material, and weight/calorie according to product types, but a font, a size, and a color may be configured differently for each template.

Figure 4C:
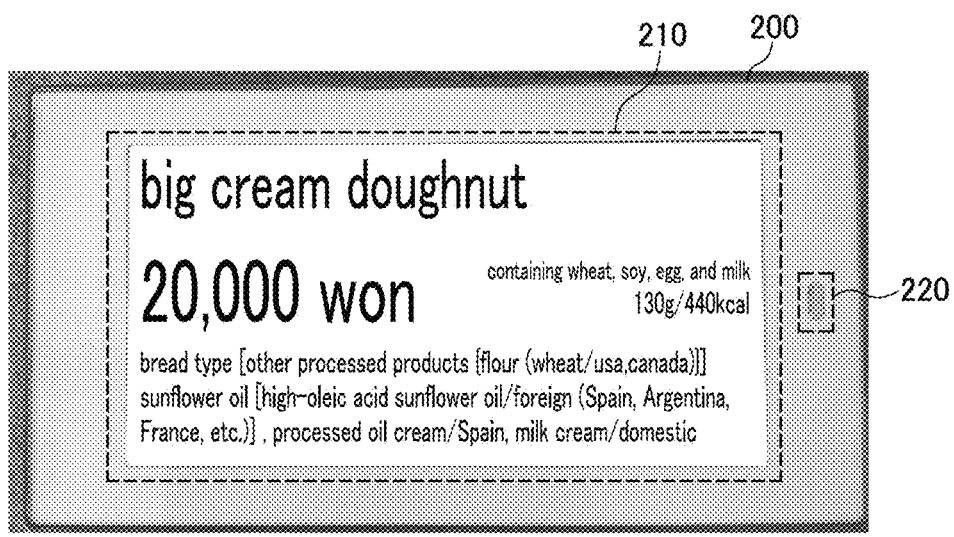
FIG. 4C is an example view of a template display of a product information display module according to an embodiment of the present disclosure.

Referring to FIG. 4C, through the above-described process, the template provided to the product information display module 200 may be displayed on the display panel 210 of the product information display module 200.

After contents selected and edited by the user terminal 100 are reflected and displayed to the template, and the template may be installed on a display stand in a store to provide information on the corresponding product to store users.

Hereinafter, a sequence of performing a method of providing a digital price display system based on NFC and Bluetooth, according to an embodiment of the present disclosure will be described with reference to FIG. 6.

First, the user terminal 100 selects product information configured as a template for displaying the product information according to a user input (S101).

Subsequently, the user terminal 100 transmits an NFC signal to the product information display module 200, the product information display module 200 activates a Bluetooth function after receiving the NFC signal, and thereby, the user terminal 100 is paired with the product information display module 200 based on the Bluetooth function (S102).

The user terminal 100 transmits product information to the product information display module 200 (S103).

The product information display module 200 displays the product information in the form of a template (S104).

According to an embodiment of the present disclosure, the web server 300 may provide a web page for managing the digital price display system based on NFC and Bluetooth to the user terminal 100 and the manager terminal 700.

Through this, the template provided to an application of the user terminal 100 may be edited and modified in advance, and product information may be provided in the form of an Excel file.

Hereinafter, a method of providing a web page for managing the digital price display system based on NFC and Bluetooth, according to an embodiment of the present disclosure will be described.

First, by using the method of providing a web page for managing the digital price display system based on NFC and Bluetooth which is performed by the web server 300, according to an embodiment of the present disclosure, the web server 300 provides a main web page 500 to the manager terminal 700.

As described above, the manager terminal 700 may be replaced with the user terminal 100, and when a license key to be described below is issued to the user terminal 100, the user terminal 100 may also serve as the manager terminal 700.

The main web page 500 according to an embodiment of the present disclosure may include a template design web page button 510, a product information management web page button 520, and a template management web page button 530 on one side thereof and provide a template design web page, a product information management web page, a template management web page, and a user setting web page by a user input.

Figure 5A:
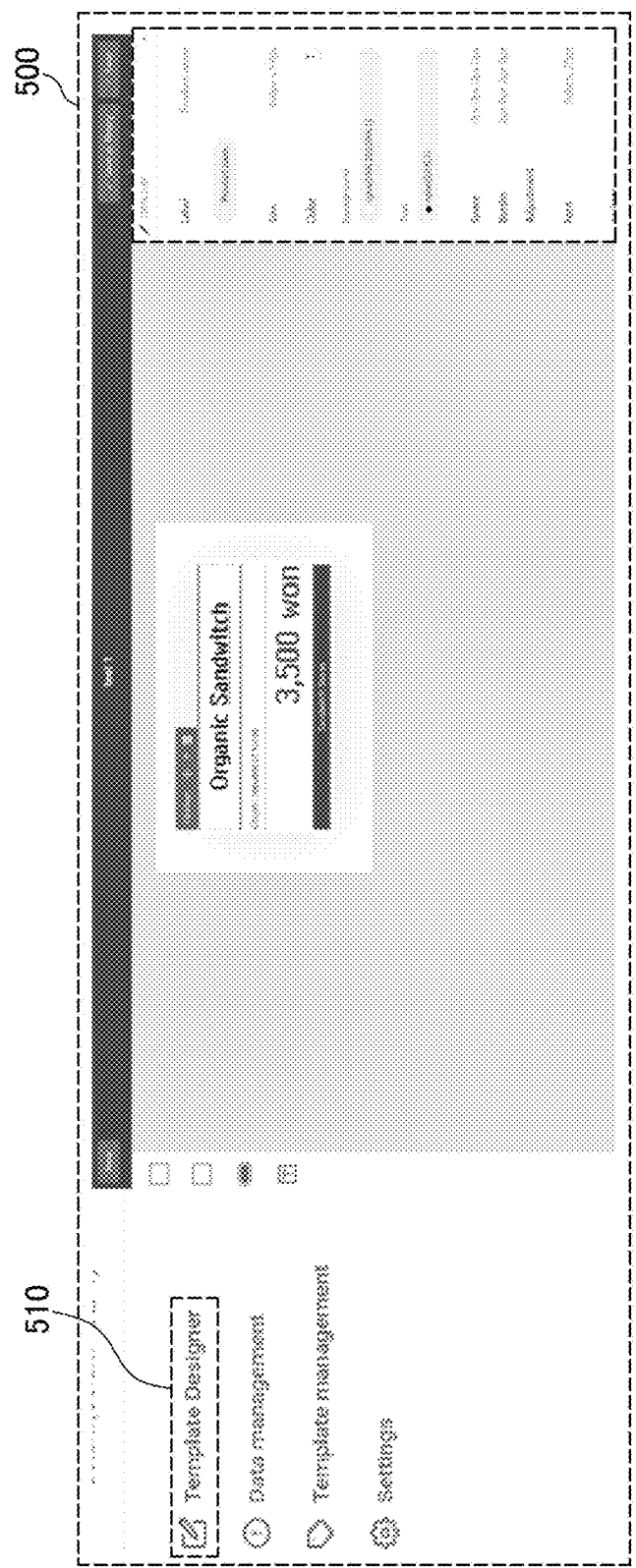
FIG. 5A is an example view of a design web page provided through a main web page, according to an embodiment of the present disclosure.

Referring to FIG. 5A, the template design web page may provide a template design function of displaying a design UI that sets a template name, a background color, a size, a text, a text color, a text size, and a font of a template on one side thereof and displaying an example of design input to the design UI on the other side, and the designed template may be stored in the web server 300.

In addition, the web server 300 may receive and store product information for each of a plurality of templates from the manager terminal 700.

Figure 5B:
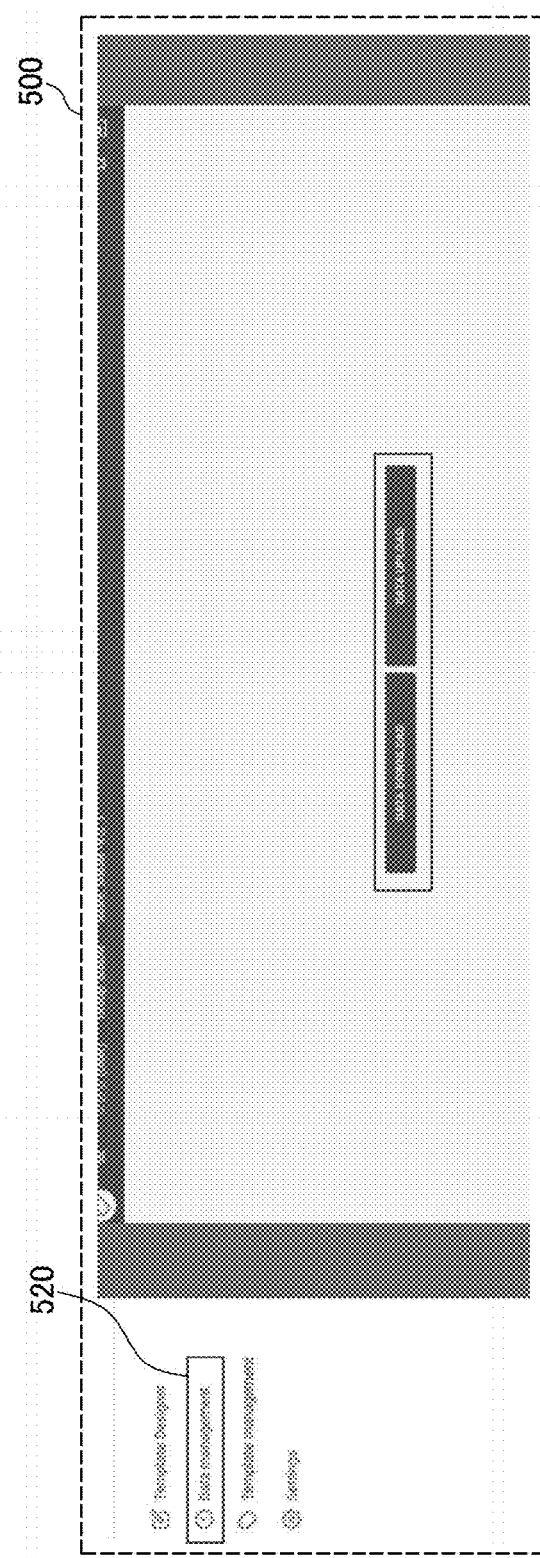
FIG. 5B is an example view of a product information management web page provided through a main web page, according to an embodiment of the present disclosure.

Referring to FIG. 5B, the product information extracted from the designed template may be converted into an Excel file and stored in the product information management web page.

In this case, the product information may provide upload and download functions for the Excel file to the user terminal 100 or the manager terminal 700 in which a license key is registered, and when the product information is written or stored in the form of an Excel file, the Excel file may be provided by an application of the user terminal 100 or the manager terminal 700.

Simultaneously or immediately after, the edited product information is updated by the application of the user terminal 100 or the manager terminal 700, and an alarm message indicating that the product information has been edited may be provided by an application to the user terminal 100 and the manager terminal 700.

Figure 5C:
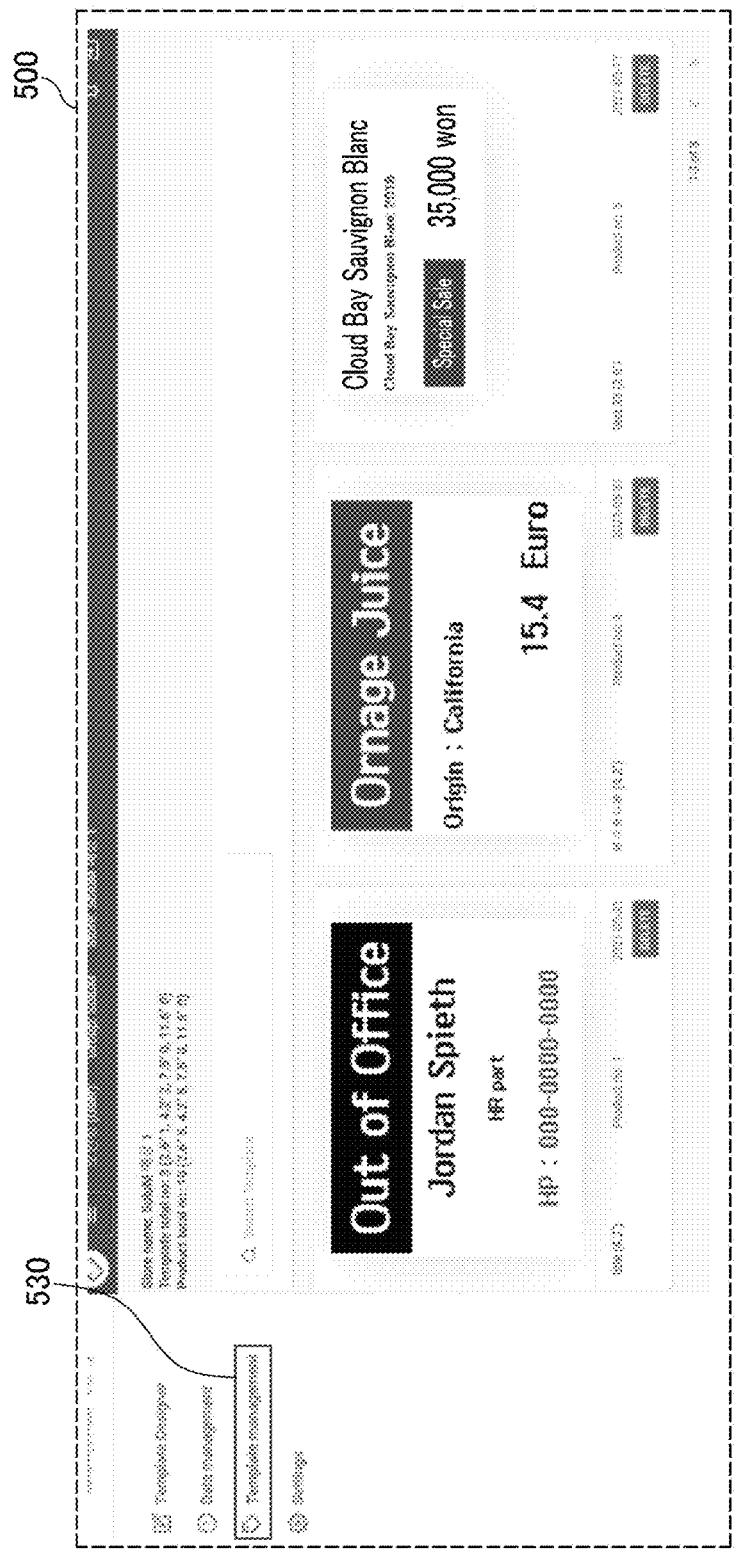
FIG. 5C is an example view of a template management web page provided through a main web page, according to an embodiment of the present disclosure.

Referring to FIG. 5C, the template management web page may provide, in the form of a library with respective thumbnails, a plurality of templates stored in the template design web page or a plurality of templates transmitted to a display module by applications of the user terminal 100 and the manager terminal 700.

In this case, when a thumbnail is clicked by a user input on the template management web page, the template may be provided to the template design web page.

In addition, the method of providing a web page for managing a digital price display system based on NFC and Bluetooth, according to an embodiment of the present disclosure may issue a license key from the manager server 600.

The manager server 600 may provide a license key issuance page to issue a unique license key for each store and provide editing rights and viewing rights for the product information to the user terminal 100 in which the license key has been registered.

The license key may be issued by a request of the web server 300 from the manager server 600 and stored in the user terminal 100 or the manager terminal 700 and include a user license key and a middle manager license key, and different product information editing rights and viewing rights may be provided depending on respective license keys.

Accordingly, the web server 300 stores information on the license key issued by the manager server 600 and provides the stored product information to the user terminal 100 or the manager terminal 700 to which the license key is input and provides a right to edit the relevant information.

When the template and product information edited through the above-described process on the web page are provided to the user terminal 100, the user terminal 100 may select product information composed of a preset template for displaying the product information according to a user input and transmit an NFC signal to the product information display module 200 to activate a Bluetooth function, and thus, the user terminal 100 may be paired with the product information display module 200 based on the Bluetooth function to display the received template and product information.

Hereinafter, a sequence of performing the method of providing a web page for managing the digital price display system based on NFC and Bluetooth, according to an embodiment of the present disclosure will be described with reference to FIG. 7.

First, the web server 300 provides the main web page 500 to the manager terminal 700 (S201).

The web server 300 receives product information for each of a plurality of templates from the manager terminal 700 and store the product information (S202).

Thereafter, the web server 300 provides a license key issuance page to the manager terminal 700 or the user terminal 100 in the form of a web page to issue a unique license key for each store and provides editing rights and viewing rights for product information to a terminal to which the license key has been registered (S203).

The stored product information is provided to the user terminal 100 that input the license key (S204).

The present disclosure may provide a more accurate electronic price display system that may change information in real time through applications based on NFC and Bluetooth.

The present disclosure may reduce the existing replacement cost and labor cost by easily replacing and managing the existing paper tag using an application installed in the terminal, and an electronic price indicator may solve the problem that required a network construction and a large-capacity server by operating the early model based on radio frequency (RF).

Therefore, according to the present disclosure, a separate network construction or a server and an access point (AP) are not additionally installed in the facility included in the general store, and thus, a field transplant rate is high, and a better service may be provided at a lower price than the existing method and an earlier model of an electronic price display device.

An embodiment of the present disclosure may also be implemented in the form of a recording medium including instructions executable by a computer, such as a program module executed by the computer. Computer-readable media may be any available media that may be accessed by a computer and include both volatile and nonvolatile media and removable and non-removable media. In addition, the computer-readable media may include all computer storage media. The computer storage media includes both volatile and nonvolatile media and removable and non-removable media implemented by any method or technology of storing information, such as a computer readable instruction, a data structure, a program module, and other data.

Although the method and system according to the present disclosure are described with reference to specific embodiments, some or all of their components or operations may be implemented by using a computer system having a general-purpose hardware architecture.

The above descriptions on the present disclosure are for illustration, and those skilled in the art to which the present disclosure pertains may understand that the descriptions may be easily modified into other specific forms without changing the technical idea or essential features of the present disclosure. Therefore, it should be understood that the embodiments described above are illustrative in all respects and not restrictive. For example, each component described as a single type may be implemented in a dispersed form, and likewise components described as distributed may be implemented in a combined form.

The scope of the present disclosure is indicated by the following claims rather than the above detailed description, and all changes or modifications derived from the meaning and scope of the claims and their equivalents should be interpreted as being included in the scope of the present disclosure.

What is claimed is:

1. A method of providing a digital price display system based on near field communication (NFC) and Bluetooth, which is performed by a user terminal, the method comprising:

selecting, by the user terminal, product information composed of a preset template to display the product information according to a user input;

activating a Bluetooth function by transmitting an NFC signal to a product information display module by causing a rear surface of the user terminal to approach a front surface of the product information display module having an NFC communication module embedded in one region of the front surface in which a screen is displayed when the user terminal approaches the product information display module selected by a user, automatically activating the Bluetooth function after the product information display module receives the NFC signal, and pairing the user terminal with the product information display module based on the Bluetooth function when the Bluetooth function is activated;

transmitting, by the user terminal, the product information to the product information display module;

displaying the product information by the product information display module; and in response to the rear surface of the user terminal approaching the front surface of the product information display module, receiving, by the user terminal, product information through NFC communication and the Bluetooth function from the product information display module, providing, by the user terminal, an editing UI indicating the product information, and transmitting, by the user terminal, the product information corrected by reflecting an editing input of the user terminal to the product information display module to be displayed, wherein the product information in the selecting of the product information is previously generated and stored by another person in a web server and is provided from the web server to the user terminal as an application is executed in the user terminal, the template includes at least one of a product name, an
   English product name, a country of origin, a product
   price, a raw material, and weight/calorie depending on
   product types, and a font, a size, and a color are
   configured differently for each template,
in the selecting of the product information, as a template
   management application is executed by the user terminal, a main UI including a tag registration button
   image, a tag management button image, and a template
   management button image is provided to the user
   terminal, and when the tag registration button image is
   clicked, a tag registration guide UI is provided,
the tag registration guide UI includes a template selection
   button image, a tag activation button image, and a data
   transmission button image,
in response to the template selection button image being
   clicked, a template selection UI is provided which
   provides a plurality of templates received from the web
   server in thumbnail format for each standard of the
   product information display module,
in response to the thumbnail being clicked by a user input,
   an editing UI is provided,
the editing UI includes a setting region for randomly
   setting a font, a size, and a color for the template, a
   preview button image providing an example in which
   the setting for the template is displayed on the product
   information display module in one region of a lower
   portion of the setting region, and a selection completion
   button image,
in response to the selection completion button image
   being clicked, a completion GUI indicating that template selection is completed is provided on the template
   selection button image in the tag registration guide UI,
the activating of the Bluetooth function comprises that,
   the completion GUI is provided on the tag activation
   button image,
the transmitting of the product information comprises
   that, the completion GUI is displayed on the data
   transmission button image, and a transmission completion page indicating that data transmission is completed
   is provided by the application of the user terminal, and
a light source of the product information display module
   emits green light to indicate that the data transmission
   is completed.

2. The method of claim 1, wherein the pairing is a master-slave connection in which the product information display module is a master and the user terminal is a slave, and the product information display module is automatically paired with the nearest user terminal.

3. The method of claim 1, wherein,
when the tag management button image is clicked, a
   product information display module list including identification information on at least one product information display module set to receive and transmit a
   template from the user terminal is provided by the user
   input,
when the user terminal is paired with the product information display module in a state in which the tag
   management button image is clicked, an editing UI for
   the template displayed by the product information
   display module is provided, and
when the identification information in the product information display module list is clicked, the template
   currently transmitted by the product information display module is provided to the user terminal, and an
   editing UI for the template is provided.

4. The method of claim 1, wherein, when the template management button image is clicked, the template selection UI is provided, and when a specific thumbnail is selected, an editing UI for a relevant template is provided.

5. A user terminal for performing a method of providing a digital price display system based on NFC and Bluetooth, the user terminal comprising:
a memory storing a program for performing the method of
   providing the digital price display system based on
   NFC and Bluetooth; and
a processor for executing the program,
wherein the method comprises:
selecting, by the user terminal, product information composed of a preset template to display the product
   information according to a user input;
activating a Bluetooth function by transmitting an NFC
   signal to a product information display module by
   causing a rear surface of the user terminal to approach
   a front surface of the product information display
   module having an NFC communication module
   embedded in one region of the front surface in which a
   screen is displayed when the user terminal approaches
   the product information display module selected by a
   user, automatically activating the Bluetooth function
   after the product information display module receives
   the NFC signal, and pairing the user terminal with the
   product information display module based on the Bluetooth function when the Bluetooth function is activated;
transmitting, by the user terminal, the product information
   to the product information display module;
displaying the product information by the product information display module; and
in response to the rear surface of the user terminal
   approaching the front surface of the product information display module, receiving, by the user terminal,
   product information through NFC communication and
   the Bluetooth function from the product information
   display module, providing, by the user terminal, an
   editing UI indicating the product information, and
   transmitting, by the user terminal, the product information corrected by reflecting an editing input of the
   user terminal to the product information display module to be displayed,
wherein the product information in the selecting of the
   product information is previously generated and stored
   by another person in a web server and is provided from
   the web server to the user terminal as an application is
   executed in the user terminal, and
the template includes at least one of a product name, an
   English product name, a country of origin, a product
   price, a raw material, and weight/calorie depending on
   product types, and a font, a size, and a color are
   configured differently for each template,
in the selecting of the product information, as a template
   management application is executed by the user terminal, a main UI including a tag registration button
   image, a tag management button image, and a template
   management button image is provided to the user
   terminal, and when the tag registration button image is
   clicked, a tag registration guide UI is provided,
the tag registration guide UI includes a template selection
   button image, a tag activation button image, and a data
   transmission button image,
in response to the template selection button image being
   clicked, a template selection UI is provided which
   provides a plurality of templates received from the web server in thumbnail format for each standard of the product information display module, in response to the thumbnail being clicked by a user input, an editing UI is provided, the editing UI includes a setting region for randomly setting a font, a size, and a color for the template, a preview button image providing an example in which the setting for the template is displayed on the product information display module in one region of a lower portion of the setting region, and a selection completion button image, in response to the selection completion button image being clicked, a completion GUI indicating that template selection is completed is provided on the template selection button image in the tag registration guide UI, the activating of the Bluetooth function comprises that, the completion GUI is provided on the tag activation button image, the transmitting of the product information comprises that, the completion GUI is displayed on the data transmission button image, and a transmission completion page indicating that data transmission is completed is provided by the application of the user terminal, and a light source of the product information display module emits green light to indicate that the data transmission is completed.

* * * * *